US007702408B2

(12) United States Patent
Abrams, Jr.

(10) Patent No.: US 7,702,408 B2
(45) Date of Patent: Apr. 20, 2010

(54) EXTENDING DIGITAL RIGHTS MANAGEMENT AND AUTHENTICATION TO AUDIO SPEAKERS

(75) Inventor: Thomas Algie Abrams, Jr., Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/397,175

(22) Filed: Mar. 3, 2009

(65) Prior Publication Data

US 2009/0171488 A1 Jul. 2, 2009

Related U.S. Application Data

(63) Continuation of application No. 10/444,173, filed on May 23, 2003, now Pat. No. 7,509,180.

(51) Int. Cl.
*G06F 17/00* (2006.01)
*H04R 3/00* (2006.01)

(52) U.S. Cl. .................... 700/94; 381/117; 381/401

(58) Field of Classification Search .......... 700/94; 381/56, 59, 96, 117, 332, 394, 401; 725/22
See application file for complete search history.

(56) References Cited

U.S. PATENT DOCUMENTS

| 4,243,839 | A |   | 1/1981 | Takahashi et al. |
| 4,739,398 | A | * | 4/1988 | Thomas et al. ................ 725/22 |
| 5,197,104 | A |   | 3/1993 | Padi |
| 5,430,802 | A |   | 7/1995 | Page |
| 5,612,729 | A | * | 3/1997 | Ellis et al. ..................... 725/22 |
| 5,862,237 | A | * | 1/1999 | Kishigami et al. .......... 381/117 |
| 6,732,275 | B1 |   | 5/2004 | Dimenstein |
| 7,020,704 | B1 |   | 3/2006 | Lipscomb et al. |
| 7,088,823 | B2 |   | 8/2006 | Fetkovich |
| 7,111,169 | B2 |   | 9/2006 | Ripley et al. |
| 7,222,071 | B2 |   | 5/2007 | Neuhauser et al. |
| 2002/0072816 | A1 |   | 6/2002 | Shdema et al. |

OTHER PUBLICATIONS

Saarinen, et al., "Nonius: Implementing a DRM System", HIT Technical Report, Dec. 10, 2002, pp. 1-27.

* cited by examiner

*Primary Examiner*—Vivian Chin
*Assistant Examiner*—Joseph Saunders, Jr.
(74) *Attorney, Agent, or Firm*—Lee & Hayes, PLLC (57) ABSTRACT

A system and method for playing audio material is described. The audio material is illustratively downloaded from a network, or from a storage media, each coupled to a loudspeaker through a speaker drive unit. A speaker authorization signal is provided to the speaker drive unit from the network or storage media. The speaker drive unit provides an audio signal to the loudspeaker if the authorization signal indicates that the loudspeaker is authorized to play the audio material. The speaker drive unit does not provide an audio signal to the loudspeaker if the authorization signal indicates that the loudspeaker is not authorized to play the audio material. The system and method includes a monitoring unit to furnish a signal indicating the sound generated by the loudspeaker, to be stored, and to determine whether the loudspeaker has played the audio material.

16 Claims, 7 Drawing Sheets

EXTENDING DIGITAL RIGHTS MANAGEMENT AND AUTHENTICATION TO AUDIO SPEAKERS

RELATED APPLICATION

This is a continuation application which claims priority to commonly assigned co-pending U.S. patent application Ser. No. 10/444,173, entitled "Extending Digital Rights Management and Authentication to Audio Speakers" to Abrams et al., filed on May 23, 2003, which is incorporated by reference herein for all that it teaches and discloses.

TECHNICAL FIELD

This invention relates generally but not exclusively to a loudspeaker system, and more particularly but not exclusively relates to systems and methods to play digital audio material by a loudspeaker system if an authorization signal is received by the loudspeaker system, and to monitor the sound played by the loudspeaker system for storage and determination of what was played by the loudspeaker system.

BACKGROUND

Now that more powerful computers, high-speed internet connections, and superior compression technologies are available to just about everyone, the demand for digital media content is greater than ever. With instant and anytime access to literally millions of their favorite music and videos, consumers are applauding the convenience that digital distribution has suddenly afforded them. They enjoy being able to download or stream music to their hard drive or personal computer hard drive as fluidly as any TV broadcast.

While the demand for digital content grows however, so does the potential for its unauthorized use. Without a secure distribution system in place, digital media files can be easily copied or compressed into smaller files without the content owner's authorization—then distributed across the Internet for others to use. This not only violates the copyrights held by thousands of media companies, record labels, filmmakers, and recording artists; it strips these entities of valuable revenues as well.

Microsoft Windows Media Rights Manger (a registered trademark of the Microsoft Corporation) is an end-to-end digital rights management (DRM) platform that provides an effective, flexible, and most importantly-secure way for content owners to deliver music and video over the internet. DRM technologies encrypt digital media files and limit their access to only those people who have acquired proper authorization to play them. Using Windows Media Rights Manager, content owners can easily distribute digital files that govern the use of their assets, and issue licenses that enforce these rights.

It is therefore useful that content owners can employ a digital delivery system and method that protects their material from being played by unauthorized users, and that content owners can have information regarding the material that users have played.

SUMMARY

Briefly and not exclusively, a system and method of playing audio material is described. The audio material is illustratively downloaded from a network, or from a storage media, each coupled to a loudspeaker through a speaker drive unit. A speaker authorization signal is provided to the speaker drive unit from the network or storage media. The speaker drive unit provides an audio signal to the loudspeaker if the authorization signal indicates that the loudspeaker is authorized to play the audio material. The speaker drive unit does not provide an audio signal to the loudspeaker if the authorization signal indicates that the loudspeaker is not authorized to play the audio material. The system and method includes a monitoring unit to furnish a signal indicating the sound generated by the loudspeaker, to be stored, and to determine whether the loudspeaker has played the audio material.

In one exemplary embodiment, a loudspeaker system includes a circuit to receive from a coupled network an authorization of whether a loudspeaker is authorized to play as well as audio material, a loudspeaker to play the audio material if the authorization indicates that the loudspeaker is authorized to play, and a system to generate a representation of the audio material played by the loudspeaker system.

In one exemplary embodiment, a method includes providing a loudspeaker authorization signal to a loudspeaker drive circuit that is operationally coupled to a loudspeaker. If the loudspeaker authorization signal indicates that the loudspeaker drive circuit is authorized to provide a loudspeaker audio signal to the loudspeaker, the method includes enabling the loudspeaker drive circuit to provide a loudspeaker audio signal to the loudspeaker, and generating a signal representing the sound generated by the loudspeaker.

BRIEF DESCRIPTION OF THE DRAWINGS

The detailed description is described with reference to the accompanying figures.

DETAILED DESCRIPTION

As described herein, and portrayed with reference to FIGS. 1, 2, 3, 4, 5, and 6A-6B are exemplary embodiments to implement the claimed subject matter.

Figure 1:
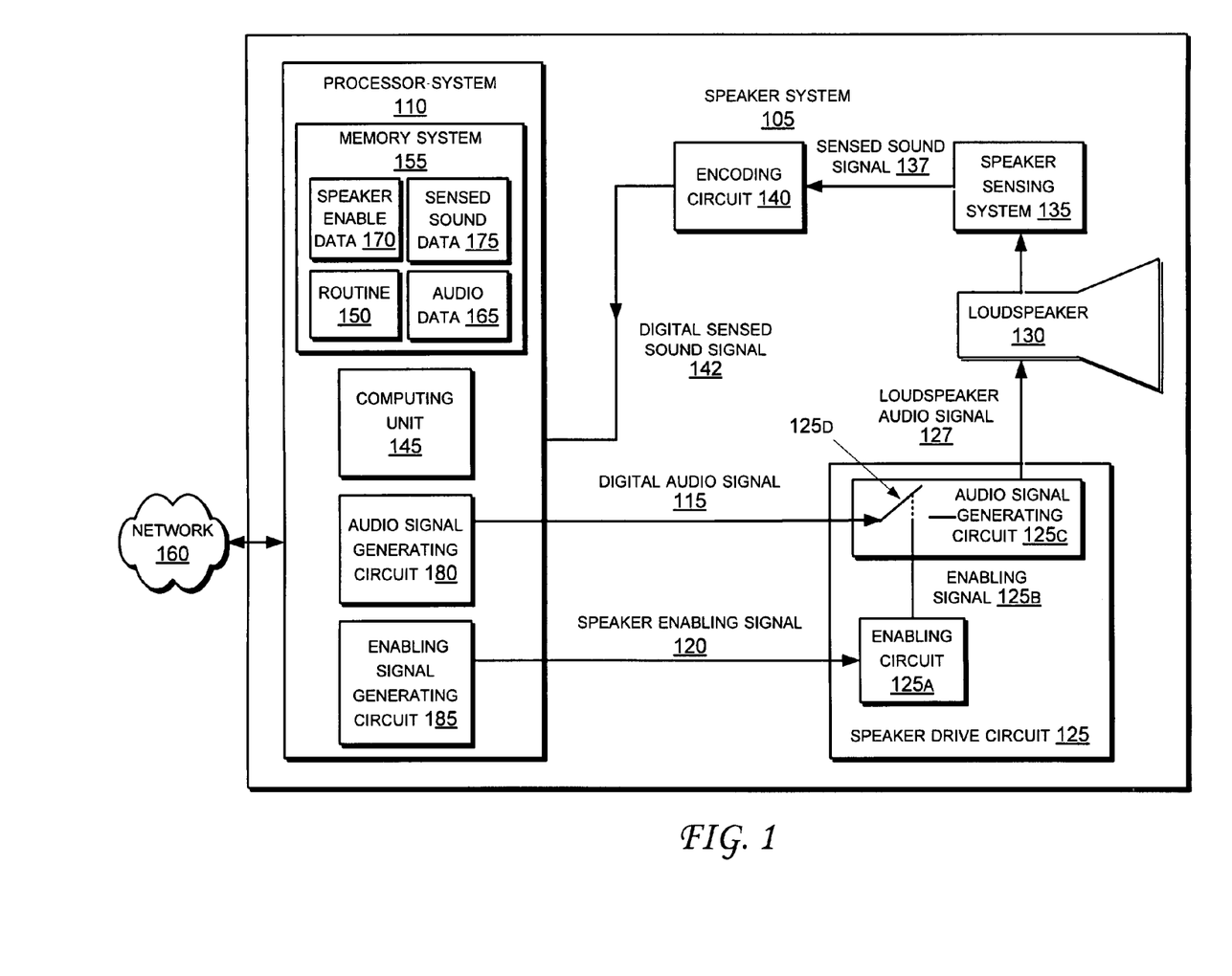
FIG. 1 portrays an exemplary speaker system configured to respond to a loudspeaker enabling signal indicating whether the loudspeaker is authorized to play, and to generate and provide to a processing system a signal representing the sound produced by the loudspeaker.

FIG. 1 shows a speaker system 105 having a processor system 110 that is configured to send both a digital audio signal 115 and a speaker enabling signal 120 to a speaker drive circuit 125. The digital audio signal 115 represents the audio material to be played by the speaker system 105. In one implementation, the audio signal 115 and the speaker enabling signal 120 together compose a common digital signal, each including different fields of the common signal. The speaker drive circuit 125 is operationally coupled to a loudspeaker 130. The speaker drive circuit 125 is configured to provide to the loudspeaker 130 a loudspeaker audio signal 127 based on the digital audio signal 115, if the speaker enabling signal 120 indicates that the loudspeaker 130 is authorized to play.

The speaker drive circuit 125 is configured to generate the loudspeaker audio signal 127 by transforming the digital audio signal 115 into an audio signal that is compatible for driving the loudspeaker 130. The digital audio signal 115 comprises a sequence of bits representing the audio material to be played by the loudspeaker 130. In one implementation, each word of the digital audio signal 115 comprises a serial sequence of bits. In one implementation, each word of the digital audio signal 115 comprises parallel bits. The loudspeaker 130 converts the loudspeaker audio signal 127 into sound energy. The loudspeaker 130 is any type of loudspeaker, such as an electromagnetic type loudspeaker, a crystal type loudspeaker that exhibits the piezoelectric effect, or an electrostatic type loudspeaker. One implementation of such a loudspeaker 130 is as a multi-voice-coil winding type loudspeaker for an input digital loudspeaker audio signal 127, each separate voice-coil winding being driven by a separate bit of the loudspeaker audio signal 127. Such a loudspeaker 130 is illustratively described with reference to FIG. 3. One implementation of such a loudspeaker 130 is as a voice-coil winding type loudspeaker for an input analog loudspeaker audio signal 127, illustratively described with reference to FIG. 4.

The speaker enabling signal 120 indicates whether or not the loudspeaker 130 is authorized to play. The speaker enabling signal is generated by an enabling signal generating circuit to be described presently. In one implementation, the instantaneous value of speaker enabling signal 120 indicates whether or not the loudspeaker 130 is authorized to play. In one implementation, the speaker enabling signal 120 indicates whether or not the loudspeaker 130 is authorized to play according to the value of the speaker enabling signal 120 over time, such as according to a sequence of binary pulses or other temporally coded signal. If the speaker enabling signal 120 indicates that the loudspeaker 130 is authorized to play, the speaker drive circuit 125 is configured to provide to the loudspeaker 130 a loudspeaker audio signal 127. If the speaker enabling signal 120 indicates that the loudspeaker 130 is not authorized to play, the speaker drive circuit 125 is configured to not provide to the loudspeaker 130 a loudspeaker audio signal 127.

Figure 3:
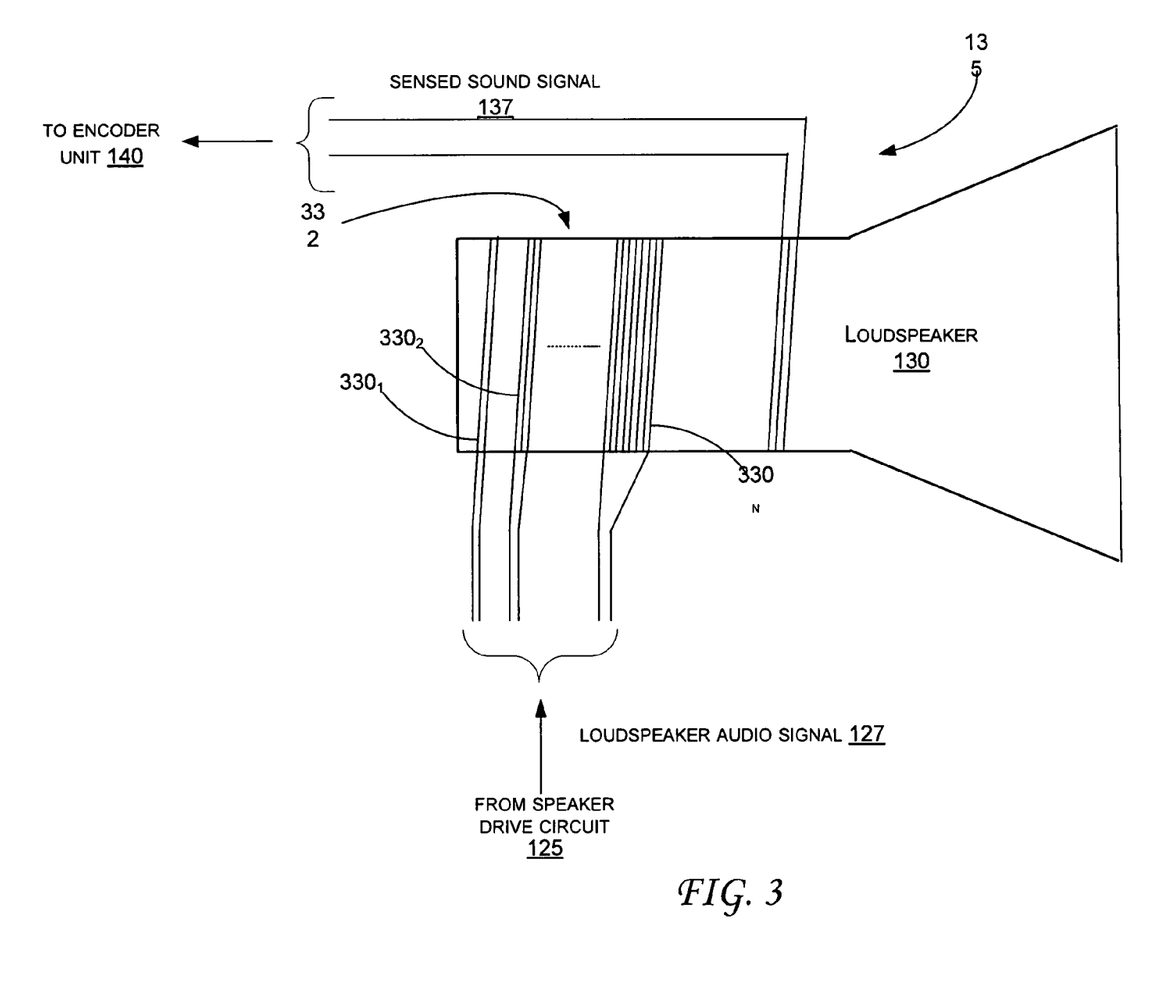
FIG. 3 portrays an exemplary loudspeaker having a coupled exemplary speaker sensing system. The exemplary portrayed loudspeaker is a flux driven electromagnetic voice-coil type loudspeaker, configured for playing a digital loudspeaker audio signal.

In one implementation, the speaker drive circuit 125 includes an enabling circuit 125A configured to receive the speaker enabling signal 120, and to convert the indication of whether or not the loudspeaker 130 is authorized to play that is contained within the speaker enabling signal 120, into an enabling signal 125B. The enabling signal 125B is input into the audio generating circuit 125 to enable or disable the audio signal generating circuit 125C in providing a loudspeaker audio signal 127 to the loudspeaker 130. The enabling mechanism 125D is portrayed herein a switch icon. In practice, the enabling mechanism 125D is a circuit to enable or disable the audio signal generating circuit 125C providing the loudspeaker audio signal 127 to the loudspeaker 130, such as a solid state switching device to control the audio signal path, or operation of the audio signal generating circuit 125B. FIG. 3 describes one illustrative implementation of the speaker drive circuit 125 in which the loudspeaker 130 is actuated by a digital audio drive signal and the speaker enabling signal 120 is a digital signal. FIG. 5 describes one illustrative implementation of the speaker drive circuit 125 in which the loudspeaker 130 is actuated by an analog audio drive signal and the speaker enabling signal 120 is a digital signal. Illustrative embodiments of the enabling circuit are described presently with reference to FIGS. 4 and 5.

The speaker sensing system 135 senses the sound that is generated by the loudspeaker 130, and causes an electrical signal termed herein a sensed sound signal 137 representative of the sound generated by the loudspeaker 130. In one implementation, the speaker sensing system 135 causes the sensed sound signal 137 by transducing the sound generated by the loudspeaker 130 into an electrical signal. In one implementation, the speaker sensing system 135 causes the sensed sound signal 137 by sensing another physical characteristic that is representative of the sound generated by the loudspeaker 130, and transforming the sensed physical characteristic into an electrical signal. In one illustrative implementation, the speaker sensing system 135 senses as a physical characteristic that is representative of the sound generated by the loudspeaker 130, the vibration of the loudspeaker 130 in producing the sound. In one illustrative implementation, the speaker sensing system 135 senses as a physical characteristic that is representative of the sound generated by the loudspeaker 130, the drive signal that causes the vibration of the loudspeaker 130. Illustratively, in one implementation that is described with reference to both FIG. 3, the speaker sensing system 135 senses the flux generated by the voice-coil winding of the loudspeaker 130, representative of the sound generated by the loudspeaker 130, and transduces the sensed flux into an electrical signal.

The sensed sound signal 137 representing the sound energy is provided to an operationally coupled encoding circuit 140. The encoding circuit 140 transforms the electrical signal representing the sound energy into a digital sensed sound signal 142 compatible with reception by processor system 110. In one implementation, the encoding circuit 140 includes an analog-to digital converter. In one implementation, the encoding circuit 140 includes a circuit to transform the sensed sound signal 137 into a format compatible with a specified protocol, such as a digital rights media protocol, a compression protocol, an operating system media protocol, an encryption protocol, and the like. The encoding circuit 140 provides the digital signal to the operationally coupled processor system 110. In one implementation, the speaker sensing system 135 provides a digitally encoded electrical signal to the processor system 110, and the encoding circuit 140 is not deployed in the speaker system 105. In one implementation, the encoding circuit 140 provides the encoded signal to the network 160.

The processor system 110 includes a computing unit 145 having at least one processor to execute a routine 150. The computing unit 145 is itself illustratively a general purpose computer capable of executing program instructions on data. The routine 150 is stored in an operationally coupled memory system 155. The memory system includes a storage media to store routine instructions, and data. The routine 150 includes instructions that the computing unit 145 executes to perform the actions described herein.

In one implementation, the routine 150 is downloaded from the network 160 directly to the memory system 155 and/or computing unit 145 for execution. In one implementation, audio data 165 is stored in the memory system 155. In one implementation, the audio material to be played is downloaded from the network 160 directly to the memory system 155 and/or to the computing unit 145 for execution or for writing into the audio data 165 that is stored in the memory system 155. In one implementation, the audio data 165 is compatible with a specified protocol, such as a digital rights media protocol, a compression protocol, an operating system media protocol, an encryption protocol, and the like. In one implementation, the audio material that may be downloaded from the network 160 is compatible with a specified protocol, such as a digital rights media protocol, a compression protocol, an operating system media protocol, an encryption protocol, and the like, and may be translated into another format by the computing unit 145 in response to the routine 150.

In one implementation, speaker enable data 170 is stored in the memory system 155. The speaker enable data 170 indicate whether the loudspeaker 130 is and is not authorized to play. In one implementation, the speaker enable data is downloaded from the network 160 directly to the memory system 155 and/or to the computing unit 145 for execution or for writing into the speaker enable data 170 stored in the memory system 155.

In one implementation, the sensed sound signal 142 is received by the processor system 110, and stored as sensed sound data 175 in the memory system 155. In one implementation, the computing unit 145 transforms the digital sensed sound system into a format compatible with a specified protocol, such as a digital rights media protocol, a compression protocol, an operating system media protocol, an encryption protocol, and the like. In one implementation, the computing unit 145 provides the digital sensed sound signal 142 to the network 160. In one implementation, the computing unit 145 transforms the digital sensed sound system into a format compatible with a specified protocol, such as a digital rights media protocol, a compression protocol, an operating system media protocol, an encryption protocol, and provides the transformed data to the network 160. In one implementation, the computing unit 145 analyzes the sensed sound, and/or verifies that the sensed sound data 175 matches stored sound data, such as audio data 165, for determination of whether the loudspeaker 130 played the audio data 165. In one implementation, the computing unit 145 determines whether the loudspeaker 130 generally played the audio material that may be represented by the digital audio signal 125 or the audio data 165.

In one implementation the memory system 155 includes non-volatile memory to store the routine 150, the audio data 165 and/or the speaker enable data 170 such as a solid state storage media or an electrically or optically encodable storage media. In one implementation the memory system 155 includes a random access memory (RAM) to write and read instructions and data from and to the computing unit 145. In one implementation the memory system storage media 155 includes a RAM to write and read audio data from and to the computing unit 145.

The processor system 110 includes an audio signal generating circuit 180 configured to generate and to provide to the coupled speaker drive circuit 125 the digital audio signal 115. In one implementation, the audio signal generating circuit 180 is configured to transform audio material received from the network 160 into the digital audio signal 115. In one implementation, the audio signal generating circuit 180 is configured to transform audio material received from the computing unit 145 into the digital audio signal 115. In one implementation, the audio signal generating circuit 180 is configured to transform audio material received from the stored audio data 165 in the memory system 155 into the digital audio signal 115. The audio material that may be received by the audio signal generating circuit 180 from the network 165, is received in one implementation indirectly from an executing computing unit 145. The audio material that may be received by the audio signal generating circuit 180 from the stored audio data 165 in the memory system 155, and in one implementation may be indirectly received from an executing computing unit 145. The audio material received from the network 160, and/or the stored audio data 165 in the memory system 155, may be compatible with a specified protocol such as a digital rights media protocol, a compression protocol, an operating system media protocol, an encryption protocol, and the like. In one implementation the logical functionality of the control circuit (180 FIG. 2) may be implemented in whole or in part by the computer unit 145 responding to a routine 150 stored in the memory system 155. In one implementation, the audio signal generating circuit 180 generates the digital audio signal 115 by transforming audio material received from the network 160 through a network connection.

The processor system 110 includes an enabling signal generating circuit 185 configured to generate and provide to the coupled speaker drive circuit 125 the speaker enabling signal 120. In one implementation, the enabling signal generating circuit 185 is configured to transform data received from the network 160 indicating whether or not the loudspeaker 130 is authorized to play, into the speaker enabling signal 120. In one implementation, the enabling signal generating circuit 185 is configured to transform data received from the speaker enabling data 170 stored in the memory system 155 indicating whether or not the loudspeaker 130 is authorized to play, into the speaker enabling signal 120. In one implementation, the enabling signal generating circuit 185 is configured to transform data received from the computing unit 145 indicating whether or not the loudspeaker 130 is authorized to play, into the speaker enabling signal 120. The data received from the network 160 indicating whether or not the loudspeaker 130 is authorized to play may be received by the enabling signal generating circuit 185 indirectly from an executing computing unit 145. The data received from the speaker enabling data 170 stored in the memory system 155 indicating whether or not the loudspeaker 130 is authorized to play may be received by the enabling signal generating circuit 185 indirectly from an executing computing unit 145. In one implementation, the enabling signal generating circuit 185 is configured to generate the speaker enabling signal 120 according to an algorithm that depends upon such factors as an identity of the loudspeaker 130, an identity and/or characteristic of a human operator (not shown), an identity and/or characteristic of the audio material to be played by the loudspeaker 130, a time, an identity and/or characteristic of the speaker system 105, and/or other data (not shown) stored in the memory system 155 and/or received from the network 160. In one implementation the logical functionality of the audio signal generating circuit 185 is implemented in whole or in part by the computing unit 145 responding to a routine 150 stored in the memory system 155. In one implementation, the enabling signal generating circuit 185 generates the enabling signal 120 by transforming a signal received from the network 160 through a network connection.

In one illustrative implementation, the computing unit 145, and memory system 155, are constituents of a general purpose computing system that is an addressable node of the network 160 for downloading audio content to the computing unit 145 and memory system 155. In one illustrative implementation, the computing unit 145 and memory system 155 are dedicated to the actions described herein and the speaker system 105 is an addressable node of the network 160 for downloading audio content.

Figure 2:
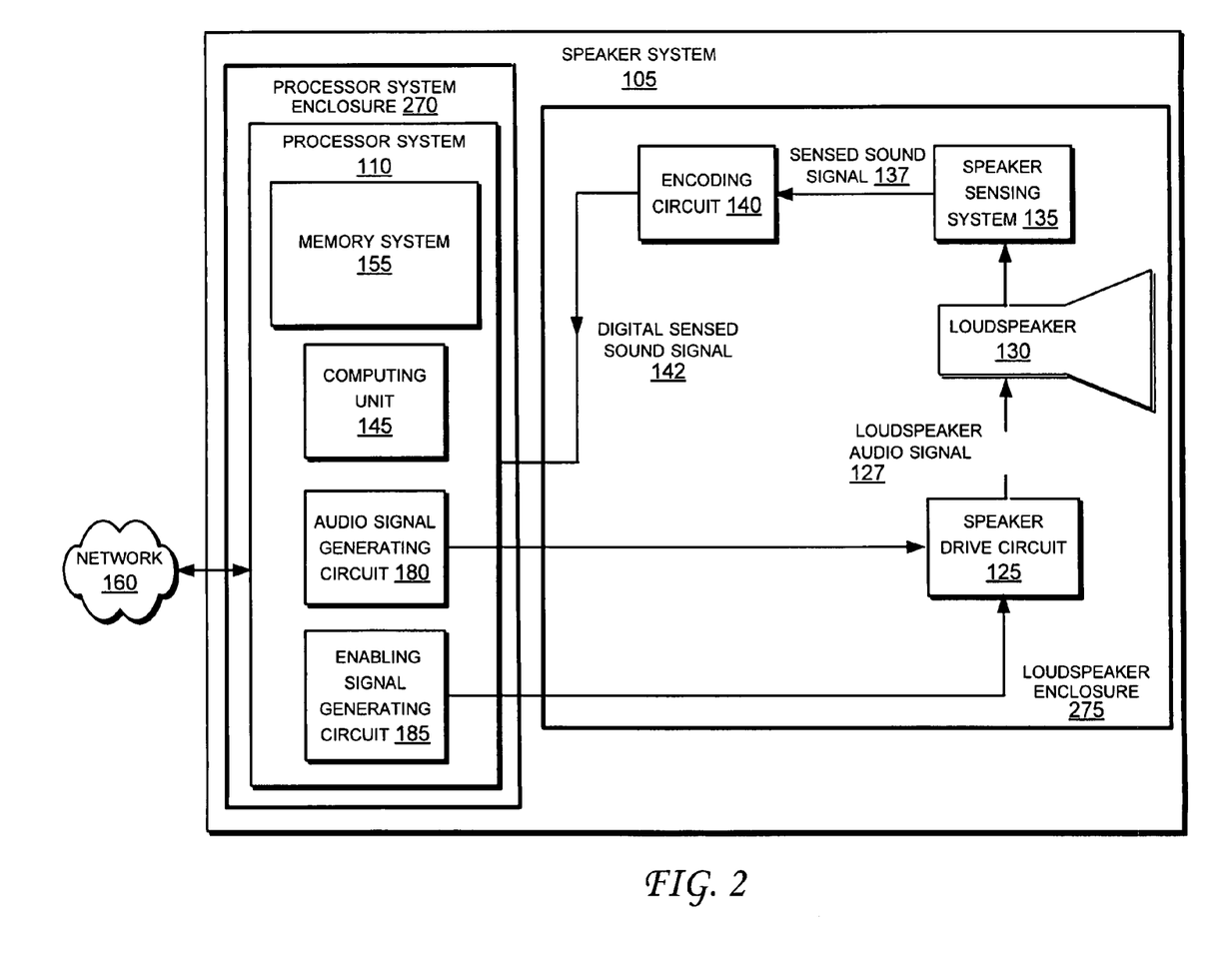
FIG. 2 portrays an exemplary physical embodiment of the speaker system portrayed in FIG. 1, having the processor system physically configured separately from the loudspeaker.

The speaker system 105 may be implemented in multiple physical embodiments. FIG. 2 shows an illustrative physical embodiment of the speaker system 105. The processor system 110 is physically configured separately from the encoding circuit 140, the speaker sensing system 135, the loudspeaker 130, and the speaker drive circuit 125, within a separate enclosure termed herein the processor system enclosure 270. The encoding circuit 140, the speaker sensing system 135, the loudspeaker 130, and the speaker drive circuit 125 are physically configured separately from the processor system 110, within a separate enclosure termed herein the loudspeaker enclosure 275. In yet another illustrative physical embodiment (not shown), the encoding circuit 140, the speaker sensing system 135, and/or the speaker drive circuit 125 are physically configured in a separate enclosure. In yet another illustrative physical embodiment, the encoding circuit 140, the speaker sensing system 135, the loudspeaker 130, and the speaker drive circuit 125 are physically configured in the processor system enclosure 270. Implementing the speaker drive circuit 125 in the same enclosure as the loudspeaker 130 offers an advantage that the loudspeaker audio signal 127 is disposed entirely within a common enclosure that offers a protection against unauthorized sensing of the audio signal.

Referring now to FIG. 3, there is shown an illustrative loudspeaker 130 for playing a digital loudspeaker audio signal 127 (FIG. 1). The illustrative loudspeaker 130 has "n" separate driver devices, each driver device operationally coupled to a least one bit of a word of the digital loudspeaker audio signal 127 that is provided by speaker drive circuit 125. The illustrative loudspeaker 130 is a flux driven electromagnetic voice-coil type loudspeaker having a voice coil 332. The voice coil 332 has "n" separate voice-coil windings $330_1$-$330_n$ concentrically wound on a movable core. Each winding $330_i$ is coupled to a distinct bit "i" of each word of the digital loudspeaker audio signal 127. Illustratively, if a bit "i+1" represents twice the audio volume of a bit "i", then each voice coil winding $330_{i+1}$ is configured to generate twice the flux of the voice coil winding $330_i$. Illustratively, each voice coil winding $330_{i+1}$ generates twice the flux of voice coil winding $330i$ by having twice the quantity of concentric windings about the voice coil 332 as the quantity of concentric windings of the voice coil winding $330_i$ (for an input current having the same derivative with respect to time). The loudspeaker 130 is operationally coupled to an illustrative speaker sensing system 135. The speaker sensing system 135 senses the sound that is generated by the loudspeaker 130, and causes the sensed sound signal 137. The illustrative speaker sensing system 135 comprises conductive windings about the voice coil 332 that is configured to sense the flux of the voice coil 332, induced by the voice coil windings $330_1$-$330_n$. The speaker sensing system 135 senses the flux generated by the voice-coil windings $330_1$-$330_n$, and transduces the sensed flux into a voltage composing the sensed sound signal 137.

Figure 4:
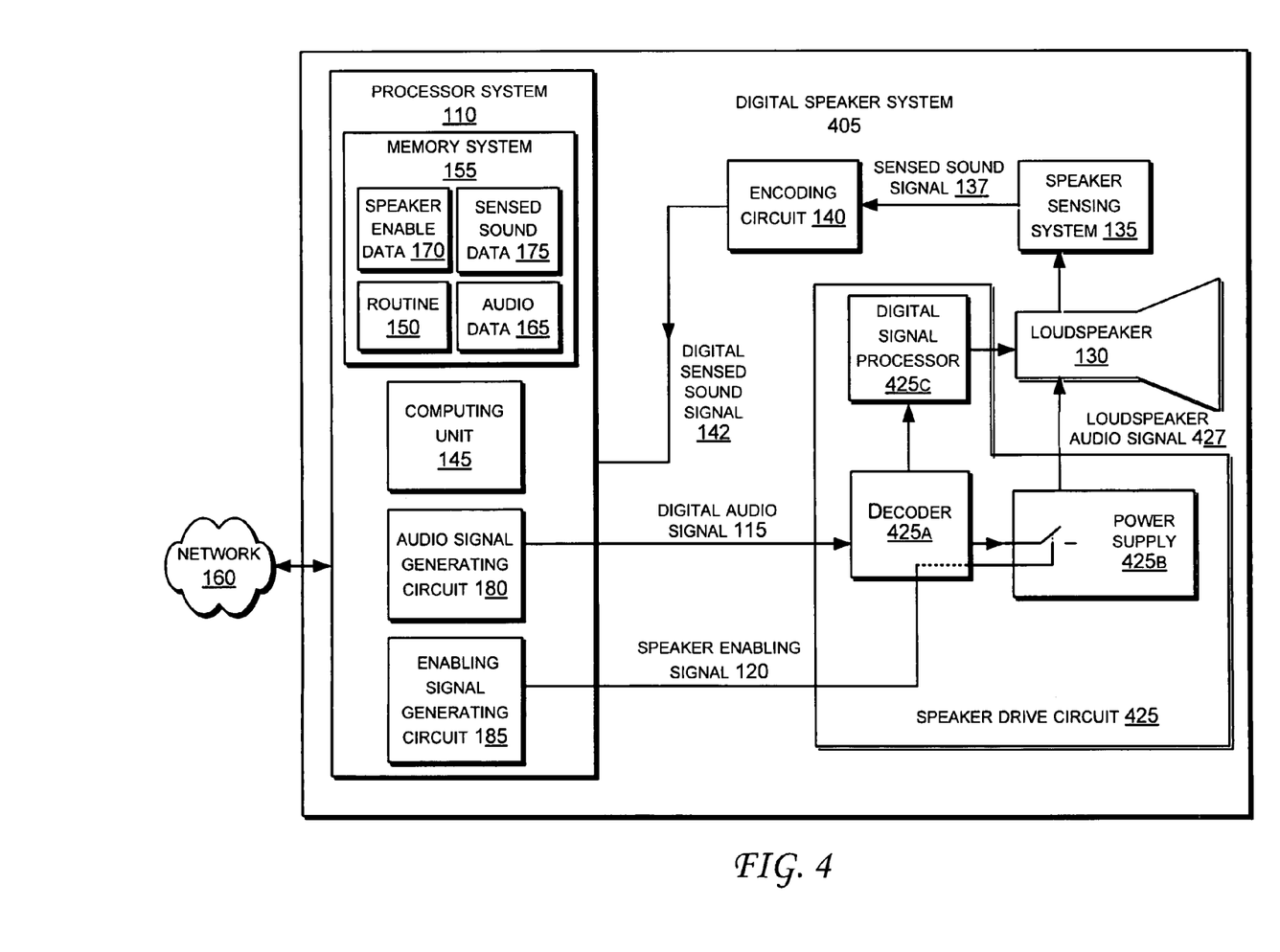
FIG. 4 portrays an exemplary speaker system that responds to a loudspeaker enabling signal and generates a signal representing the sound produced by the loudspeaker, in which the loudspeaker is actuated by a digital audio drive signal.
Figure 5:
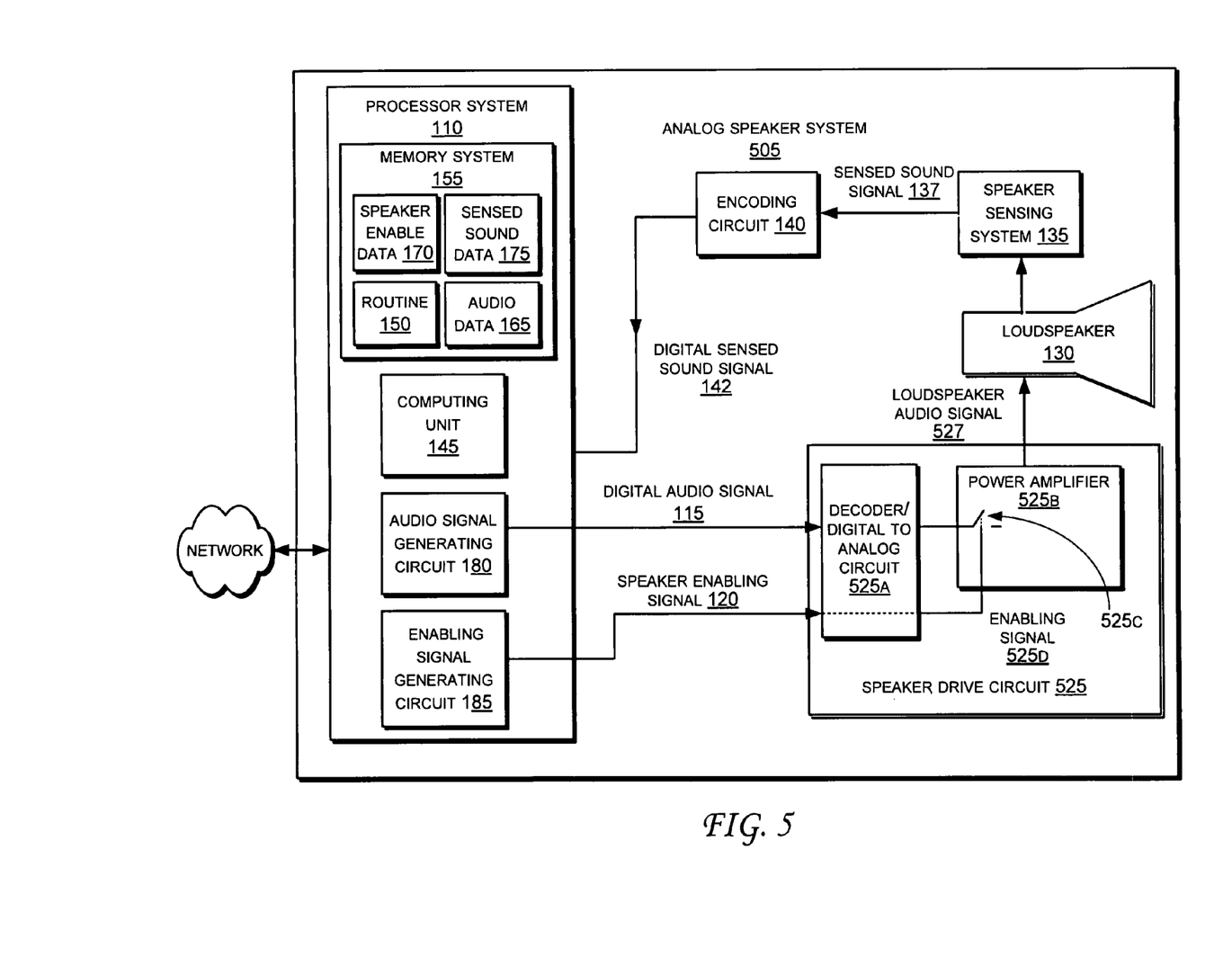
FIG. 5 portrays one exemplary speaker system that responds to a loudspeaker enabling signal and generates a signal representing the sound produced by the loudspeaker, in which the loudspeaker is actuated by an analog audio drive signal.

Referring now to FIG. 4, there is shown an illustrative speaker system 405 having a loudspeaker 130 that is configured to play a digital loudspeaker audio signal 427. An illustrative digital loudspeaker 130 is described with reference to FIG. 3. The loudspeaker 130 portrayed in FIG. 3 has "n" separate driver devices, each illustratively portrayed as "n" separate voice-coil windings $330_1$-$330_n$ (FIG. 3). Each voice coil winding $330_i$ is coupled to a distinct bit "i" of a word of the digital loudspeaker audio signal 427 provided to the loudspeaker 130 by the speaker drive circuit 425. The speaker drive circuit 425 includes a decoder 425A for separating an input digital audio signal 115 having an illustrative serial bit stream, into a parallel digital bit stream. The speaker drive circuit 425 includes a power supply 425B operationally coupled to the decoder 425A. The power supply 425B is configured to supply a voltage to each voice coil winding $330_i$, depending upon the binary value of the bit "i". Thus, if the value of bit "i" is a "1", the power supply 425B may be configured to supply a voltage to the voice coil winding $330_i$, while if the value of a bit "i" is a "0", the power supply 425B (or other distribution circuit) may be configured to not supply a voltage to the voice coil winding $330_i$. A digital signal processor 425C is operationally coupled to the decoder 425A. The digital signal processor 425C selectively distributes a voltage from the power supply 425B to the voice coil windings $330_1$-$330_n$, according to the value of the bits "1–n", and provides a common return to the power supply 425B. In one implementation, the digital signal processor 425C provides a filtered voltage to the voice coil windings $330_1$-$330_n$ to compensate for inaccuracies in the input voltage that might be induced by the switching off and on of a voltage across a voice coil $330_i$. In one implementation, the digital signal processor 425C includes intermediate power stages to linearly amplify voltages supplied to the voice coil windings $330_1$-$330_n$.

In one implementation, the digital audio signal 115 includes a distinct sign bit "i" for indicating whether the transmitted audio signal word has a positive or a negative audio volume sense. The decoder 425A is configured to sense the value of the distinct sign bit, and the power supply 425B is configured to provide a voltage sense depending on the sign bit to the voice-coil windings $330_i$. In this implementation, the power supply 425B may be a dual ended type to supply both a positive and a negative voltage to the voice coils $330_1$-$330_n$. In one implementation, voltage present across the voice-coil winding $330_i$ reverses direction depending on the value of the bit "i". The voice coil 332 (FIG. 3) has an additional coil for producing positional feedback to the digital signal processor 425C. Rather than the voice coil 331 being damped at a center position, with power required to push or pull the voice coil 331 from the center position, the digital signal processor 425 may be configured to dynamically recalculate a new center position.

The speaker drive circuit 425 is configured to respond to a speaker enabling signal 120 indicating that the loudspeaker 130 is authorized to play by enabling providing to the loudspeaker 130 the loudspeaker audio signal 427. The speaker drive circuit 425 is configured to respond to a speaker enabling signal 120 indicating that the loudspeaker 130 is not authorized to play by disabling providing to the loudspeaker 130 the loudspeaker audio signal 427. In one implementation, the speaker enabling signal 120 composes with the digital audio signal 115 a portion of a common digital signal between the processor system 110 and the speaker drive circuit 425. In this implementation, the decoder, either by dedicated circuitry or by execution by a computing unit in response to coded instructions, may detect the digital audio signal 115 as a logical "1" or a "0", and provide a voltage representing the logical value of the speaker enabling signal 120. The enabling mechanism in the speaker drive circuit 425 is a circuit to enable or disable the speaker drive circuit 525 providing a loudspeaker audio signal 527 to the loudspeaker 130, such as a switch, a solid state switching device to control the audio signal path, or a relay in the power supply 425B, to enable or disable the power supply 425B providing a voltage to the voice coil windings $330_i$-$330_n$. In one implementation, the default voltage may indicate a disable of the power supply 425B providing a voltage to the voice coil windings $330_1$-$330_n$.

Referring now to FIG. 5, there is shown an illustrative speaker system 505 having a loudspeaker 130 that is configured to play an analog loudspeaker audio signal 527. The speaker drive circuit 525 comprises a decoder/digital-to-analog converter circuit to decode (as necessary) the input digital audio signal 115, and to convert the decoded digital audio signal 115 into an analog audio signal. The analog audio signal is input into the power amplifier 525B. The power amplifier 525B is configured to amplify the analog audio signal, to transform the analog audio signal into an analog loudspeaker audio signal 527. The decoder/digital-to-analog circuit 525A decodes the speaker enabling signal 120 (as necessary) and to provide the decoded speaker enabling signal 120 to the power amplifier 525B.

In one implementation, the speaker drive circuit 525 includes an enabling circuit 525C configured to receive the speaker enabling signal 120, and to convert the indication of whether or not the loudspeaker 130 is authorized to play contained within the speaker enabling signal 120, into an enabling signal 525D. The enabling signal 525D is input into the amplifier 525B to enable or disable the amplifier 525B in providing a loudspeaker audio signal 527 to the loudspeaker 130. The enabling mechanism 525C is portrayed herein a switch. In, practice, the enabling mechanism 525C is a circuit to control the audio signal path, or operation of the he speaker drive circuit 525 providing a loudspeaker audio signal 527 to the loudspeaker 130. In one implementation, the enabling mechanism 525C is a switch, a solid state switching device to control the audio signal path, or a relay in the amplifier 525B to enable or disable the amplifier 525B.

Figure 6A:
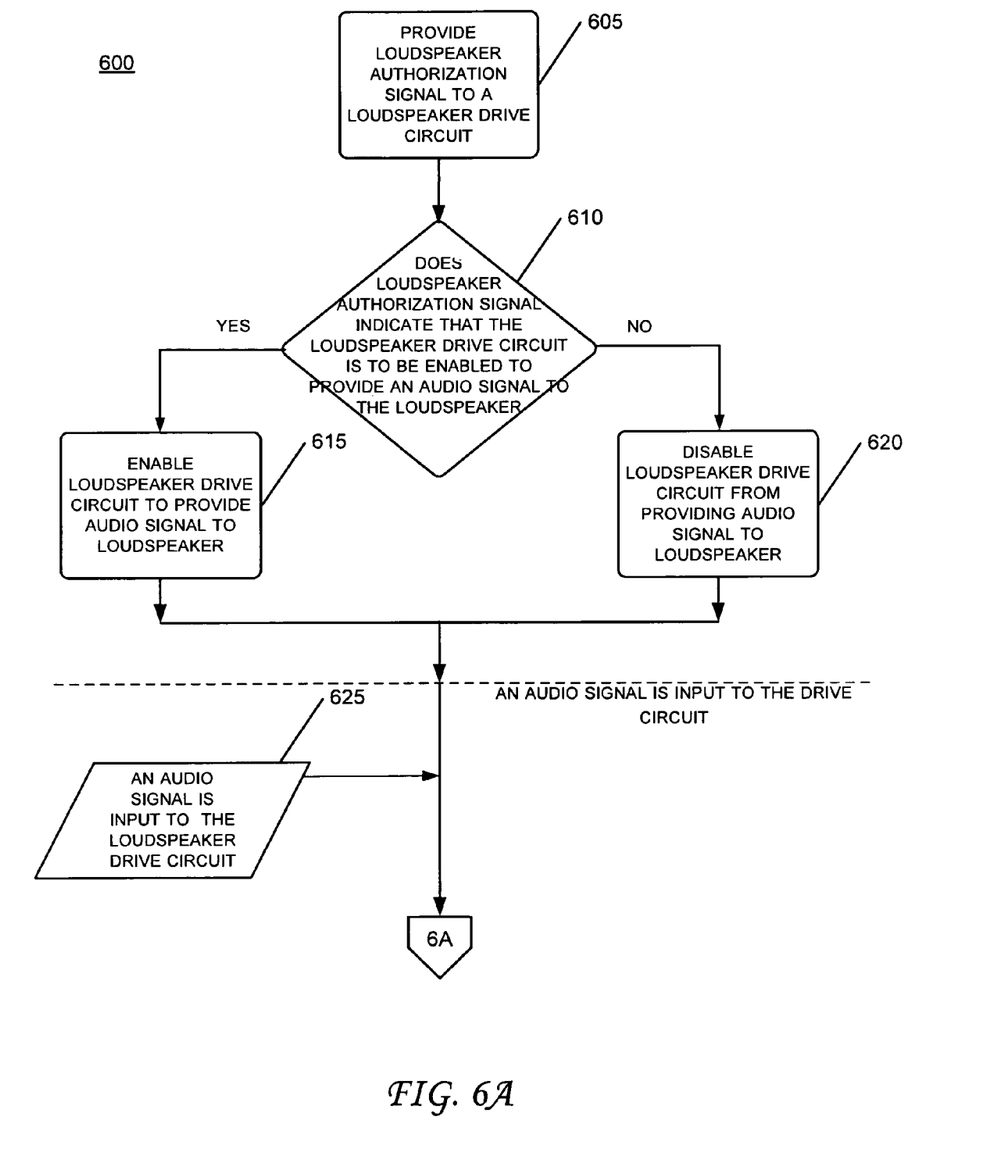
FIGS. 6A and 6B is a flow chart portraying an exemplary method of enabling or disabling a loudspeaker drive circuit from providing an audio signal to a loudspeaker, and generating a signal representative of the sound produced by the loudspeaker.
Figure 6B:
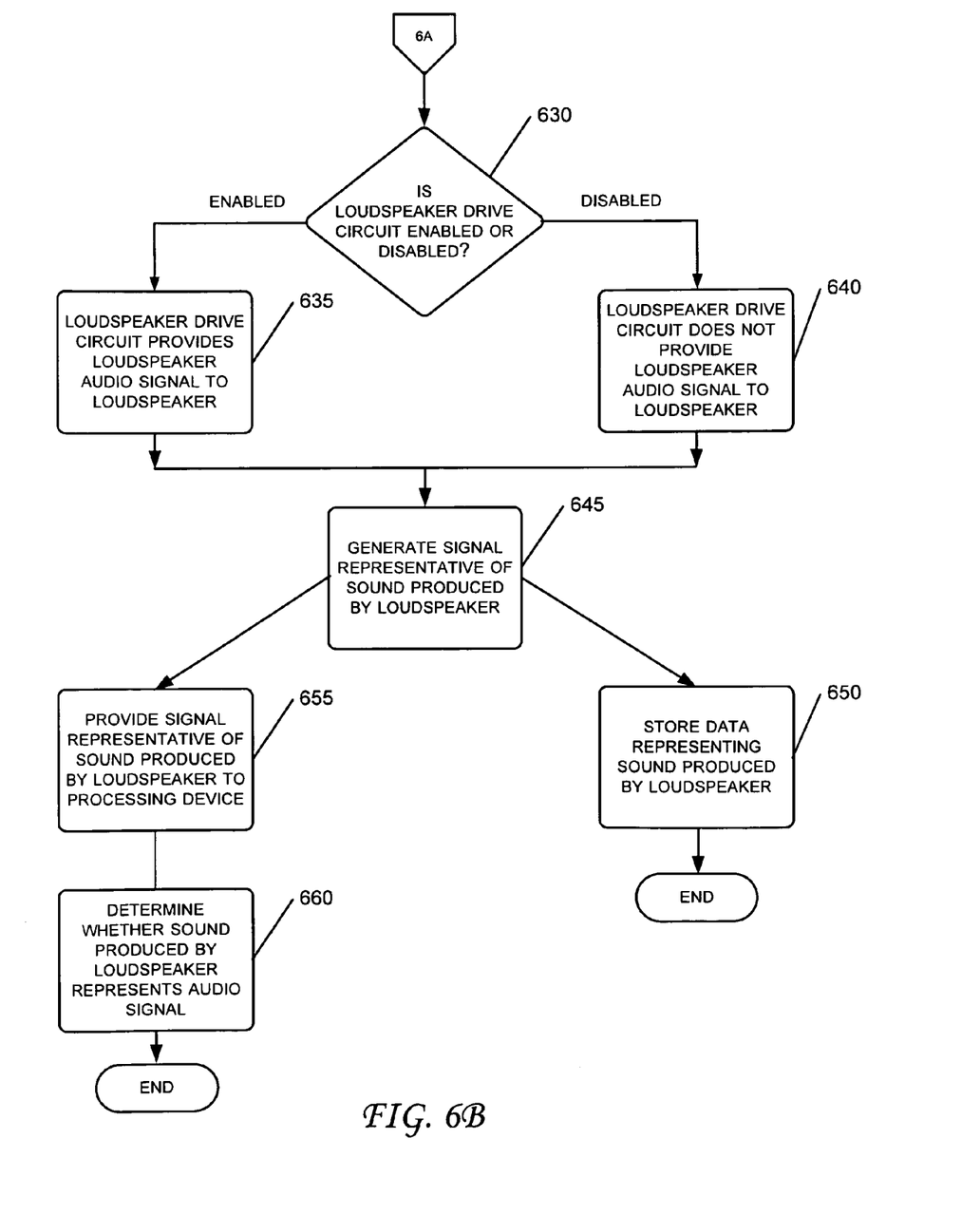

Referring now to FIGS. 6A and 6B, there is shown a flowchart portraying an exemplary method 600 of enabling or disabling a loudspeaker drive circuit from providing an audio signal to a loudspeaker, and of generating a signal representative of the sound generated by the loudspeaker.

In block 605, a loudspeaker authorization signal is provided to a loudspeaker drive circuit. The loudspeaker authorization signal indicates whether or not a loudspeaker drive circuit is to provide a loudspeaker audio signal to a loudspeaker. The loudspeaker audio signal represents the sound to be generated by the loudspeaker. The loudspeaker converts the loudspeaker audio signal into sound energy that represents the loudspeaker audio signal. In one implementation, the method 600 includes generating the loudspeaker authorization signal according to a signal received from a network connection and/or an algorithm that depends upon such factors as an identity of the loudspeaker 130, an identity and/or characteristic of a human operator (not shown), an identity and/or characteristic of the audio material to be played by the loudspeaker 130, a time, an identity and/or characteristic of the speaker system 105, and/or other data (not shown) stored in the memory system 155 and/or received from the network 160.

In block 610, the loudspeaker authorization signal is determined to indicate whether the loudspeaker drive circuit is to be enabled or that the loudspeaker is to be disabled to provide a loudspeaker audio signal to the loudspeaker. In block 615, if the "YES" branch is taken from block 610, indicating that the loudspeaker authorization signal indicates that the loudspeaker drive circuit is to be enabled to provide a loudspeaker audio signal to the loudspeaker, the loudspeaker drive circuit is enabled to provide a loudspeaker audio signal to the loudspeaker. In block 620, if the "NO" branch is taken from block 610, indicating that the loudspeaker authorization signal indicates that the loudspeaker drive circuit is to be disabled to provide a loudspeaker audio signal to the loudspeaker, the loudspeaker drive circuit is disabled to provide a loudspeaker audio signal to the loudspeaker.

Blocks 630-660, portray the exemplary method if an audio signal were to be input to the loudspeaker drive circuit. In block 625 an audio signal is input to the loudspeaker drive circuit. In block 630, the loudspeaker drive circuit is determined to be enabled or disabled as a result of the drive circuit enabling action of block 615, or disabling action of block 620. In block 635, if the loudspeaker drive circuit is enabled (the "ENABLED" branch is taken from block 630), the loudspeaker drive circuit provides a loudspeaker audio signal to the loudspeaker. If the loudspeaker drive circuit is disabled (the "DISABLED" branch is taken from block 630), the loudspeaker drive circuit does not provide a loudspeaker audio signal to the loudspeaker. In one implementation, the loudspeaker drive circuit has a default state. In one implementation, the default state of the louder drive circuit is disable.

In block 645, a signal is generated that is representative of the sound generated by the loudspeaker. In one implementation, the signal is caused by transducing the sound generated by the loudspeaker. In one implementation, the signal is caused by sensing another physical characteristic (other than the sound generated) that is representative of the sound generated by the loudspeaker, and transforming the sensed physical characteristic into the signal.

In block 650, data is stored representing the generated signal, which itself represents the sound generated by the loudspeaker. Alternatively, in block 655 the signal is provided to a processing device, and in block 660, the sound signal is reduced to data and it is determined whether the sound generated by the loudspeaker generally represents the audio material to be played, or the sound represented by the audio signal.

The phraseology and terminology used is for the purpose of description and should not be regarded as limiting. The language in the patent claims may not capture every nuance, or describe with complete precision the range of novelty. Moreover, it is understood that the depicted acts in any described method are not necessarily order dependent, and in an implementation there may be intervening acts.

The present invention is not limited by what has been particularly shown and described herein above. The specific features and operations are disclosed as exemplary forms of implementing the claimed subject matter. Therefore, the scope of the invention is defined by the claims which follow.

I claim:

1. A system comprising:
   a loudspeaker, wherein the loudspeaker comprises a coil having a plurality of separate windings, wherein each of the plurality of separate windings is coupled to a distinct bit of an incoming digital audio signal, and wherein each progressively more significant bit within the digital audio signal is coupled to a winding having progressively more turns;
   a first system to generate a representation of audio material and to provide the representation of the audio material to the loudspeaker using the digital audio signal, wherein the first system is configured to not provide the loudspeaker with the representation of the audio material if an authorization signal indicates that the loudspeaker is not authorized to play the audio material, and wherein the first system generates the authorization signal by executing an algorithm having inputs comprising an identity of the loudspeaker, a characteristic of a speaker system that comprises the loudspeaker, an identity or characteristic of a human operator, an identity or characteristic of audio material to be played by the loudspeaker and a time; and a second system to receive a representation of audio material played, and store the received representation as data.

2. The system of claim 1, wherein the second system compares the data to the audio material to determine whether the loudspeaker generally played the audio material.

3. The system of claim 1 further comprising an analog to digital signal processor to create the data from an output of a sensor receiving the representation of the audio material played, wherein the sensor is a winding sensing coil activity of the loudspeaker.

4. The system of claim 1, wherein the second system comprises a coil of windings adjacent to a coil of the loudspeaker, and wherein the coil of windings detects operation of the loudspeaker.

5. The system of claim 1, additionally comprising an encoder circuit wherein a signal from a sensor, which comprises a coil of windings adjacent to the coil of the loudspeaker, is converted to a digital representation.

6. The system of claim 1 wherein a default state of the first system is not being enabled to provide the audio material to the loudspeaker.

7. The system of claim 1, wherein the first system provides the audio material if the authorization signal indicates that the loudspeaker is authorized to play.

8. A method of driving a loudspeaker comprising:
providing a loudspeaker authorization signal to a loudspeaker drive circuit operationally coupled to a loudspeaker, wherein the loudspeaker authorization signal is obtained by operation of an algorithm having inputs comprising an identity of the loudspeaker, a characteristic of a speaker system that comprises the loudspeaker, an identity or characteristic of a human operator, an identity or characteristic of audio material to be played by the loudspeaker, and a time;
if the loudspeaker authorization signal indicates, then providing a digital audio signal to the loudspeaker, wherein the loudspeaker comprises a coil having a plurality of separate windings, wherein each of the plurality of separate windings is coupled to a distinct bit of the digital audio signal, and wherein each progressively more significant bit within the digital audio signal is coupled to a winding having progressively more turns;
sensing operation of the loudspeaker, wherein the sensing is performed by a coil about the loudspeaker, and wherein the coil provides an output signal;
converting the output signal of the sensor to data; and
comparing the data to the audio signal provided to the loudspeaker.

9. The method of claim 8 further comprising if the loudspeaker authorization signal indicates that the loudspeaker drive circuit is not authorized to provide a loudspeaker audio signal to a loudspeaker, disabling the loudspeaker drive circuit from providing the audio signal to the loudspeaker.

10. The method of claim 8 wherein a default state of the loudspeaker drive circuit is not being enabled to provide the audio signal to the loudspeaker.

11. A loudspeaker system comprising:
circuit means for receiving from a network an authorization of whether a loudspeaker is authorized to play, and audio material, wherein the authorization is obtained by operation of an algorithm having inputs comprising an identity of the loudspeaker, a characteristic of a speaker system that comprises the loudspeaker, an identity or characteristic of a human operator, an identity or characteristic of audio material to be played by the loudspeaker, and a time;
a loudspeaker to play the audio material if the authorization indicates that the loudspeaker is authorized to play, wherein the loudspeaker comprises a coil having a plurality of separate windings, wherein each of the plurality of separate windings is coupled to a distinct bit of a digital audio signal, and wherein each progressively more significant bit within the digital audio signal is coupled to a winding having progressively more turns;
means to generate a representation of the audio material played by the loudspeaker system, wherein the means to generate the representation comprises a coil about the loudspeaker, an encoder circuit to receive an output from the coil, and a digital output from the encoder; and
comparison means to determine if the digital output from the encoder represents the audio material sent to the loudspeaker.

12. The loudspeaker system of claim 11 further comprising means for receiving the representation of the audio material played and for storing the received representation as data.

13. The loudspeaker system of claim 11 further comprising means for providing data representing the representation of the audio material played by the loudspeaker to the network.

14. The loudspeaker system of claim 11 further comprising means for transforming the audio material into a loudspeaker audio signal, and providing the loudspeaker audio signal to the loudspeaker.

15. The loudspeaker system of claim 14 wherein the means for transforming the audio material into a loudspeaker audio signal provides the audio signal if the authorization indicates that the loudspeaker is authorized to play.

16. The loudspeaker system of claim 14 wherein the means for transforming the audio material into a loudspeaker audio signal does not provide the audio signal if the authorization indicates that the loudspeaker is not authorized to play.

* * * * *